Dec. 7, 1926.

E. F. O'HAVER 1,610,067

COTTON PICKER

Filed August 8, 1924     3 Sheets-Sheet 1

WITNESSES
H. T. Walker
J. L. McAuliffe

INVENTOR
Edward F. O'Haver
BY
ATTORNEYS

Dec. 7, 1926.
E. F. O'HAVER
1,610,067
COTTON PICKER
Filed August 8, 1924   3 Sheets-Sheet 2
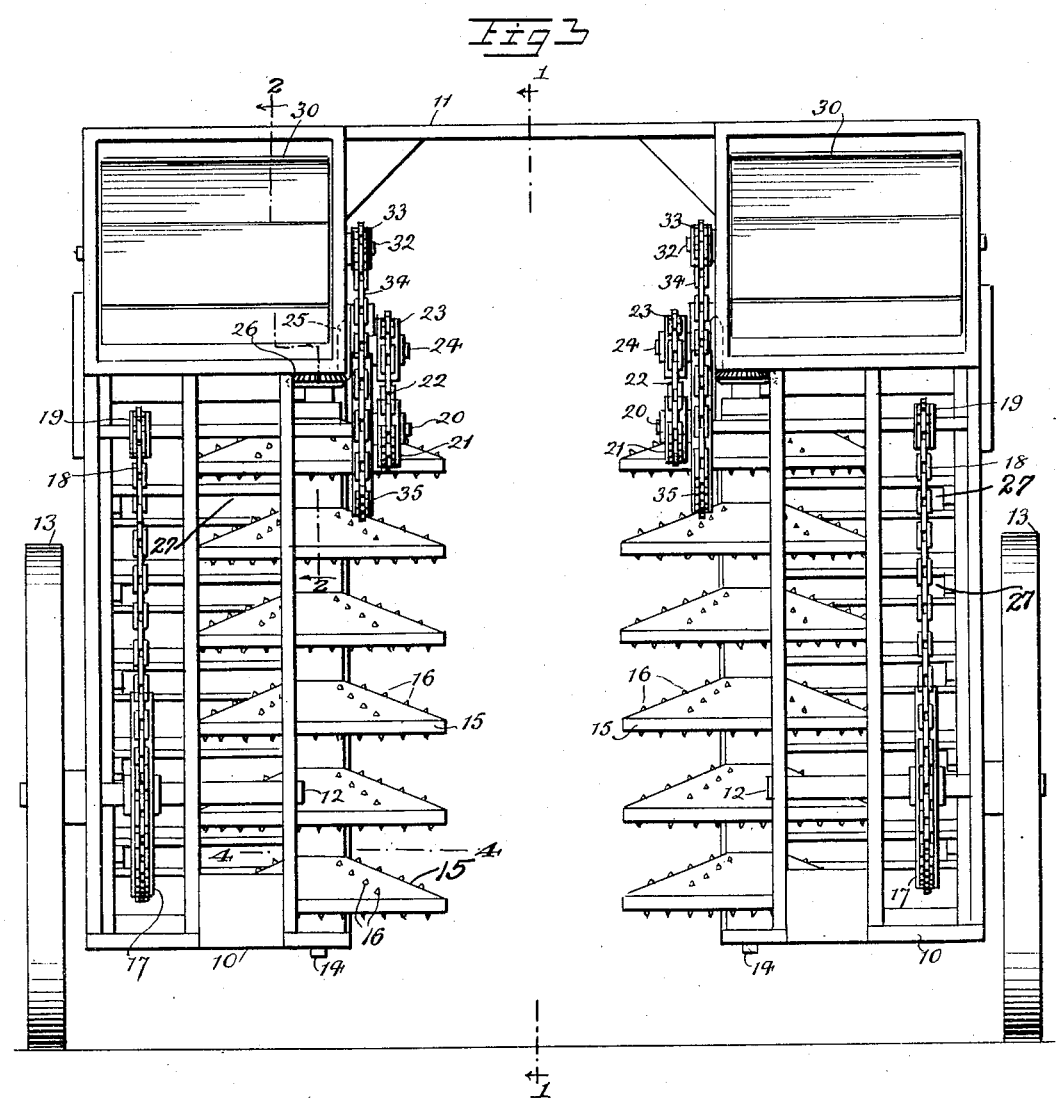
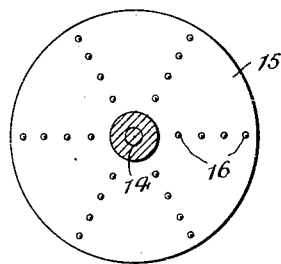
WITNESSES
H. J. Walker
INVENTOR
Edward F. O'Haver
BY
ATTORNEYS

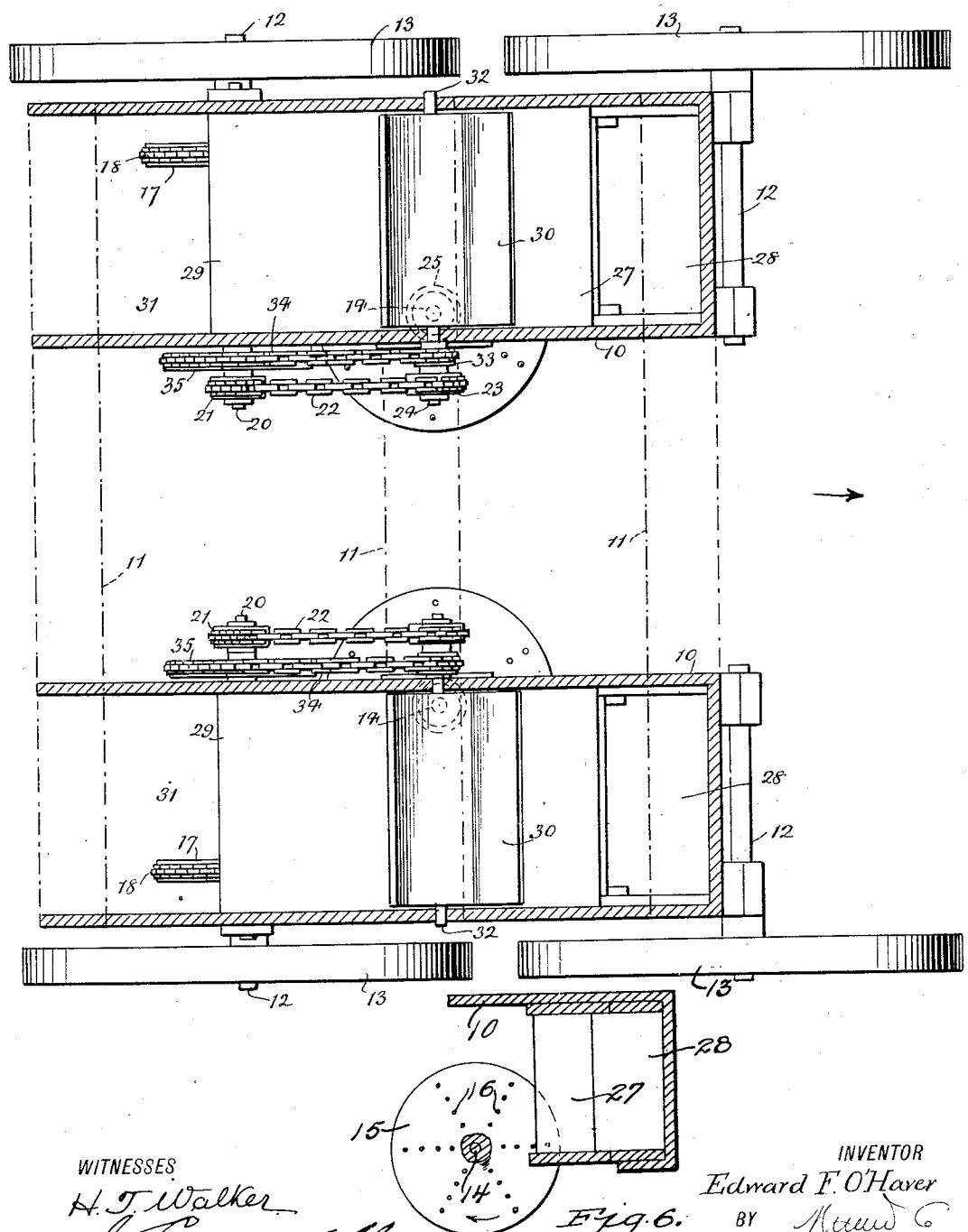

Patented Dec. 7, 1926.

1,610,067

UNITED STATES PATENT OFFICE.

EDWARD FRANCIS O'HAVER, OF CARLISLE, INDIANA.

COTTON PICKER.

Application filed August 8, 1924. Serial No. 730,902.

My invention relates to a wheeled cotton picker adapted to be drawn over a field and equipped with picker elements so disposed on the machine as to be positioned at opposite sides of a row of cotton plants for picking the lint and delivering it to the region of means to detach the lint from the picker elements and cause the lint to move to a point of discharge.

A further object of the invention is to provide a novel arrangement of the suction boxes or suction nozzles effective for drawing in the lint and directing it to a point of discharge.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 3 is a front elevation of the cotton picker;

Figure 4 is a sectional plan view showing one of the picker elements; the plane of the section being indicated by the line 4—4 in Figure 3.

Figure 5 is a sectional plan view, the section being indicated by the line 5—5, Figure 1.

Figure 6 is a fragmentary transverse section taken on line 6—6 of Figure 1, showing details of the picker and nozzle.

Figure 1:
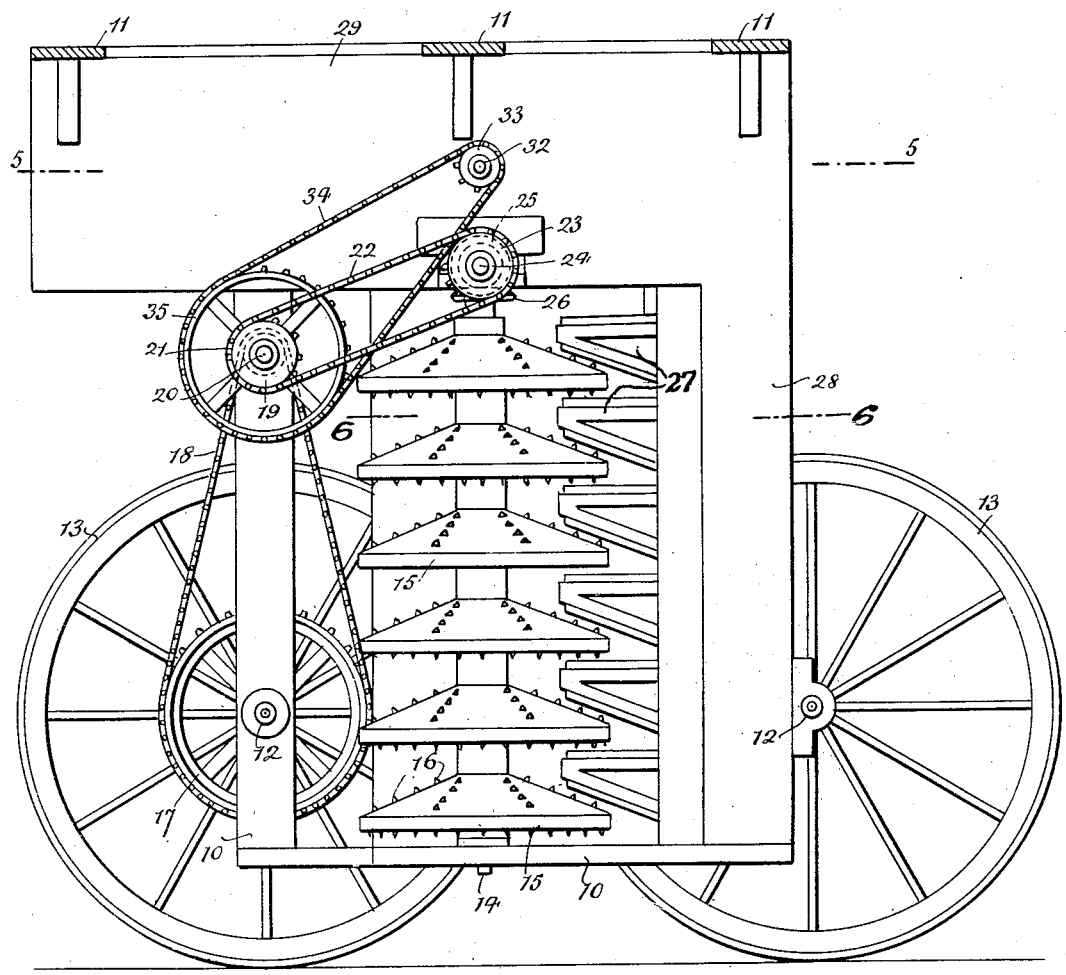
Figure 1 is a longitudinal vertical section of my improved cotton picker in a plane indicated by the line 1—1, Figure 3.

In carrying out my invention in practice in accordance with the illustrated example, two vertical side frames 10 are provided at each side of the medial plane of the picker and joined by top cross bars 11. Mounted in bearings on the frames 10 are axles 12 and running wheels 13.

Turning in the frames 10 are vertical shafts 14 and on each of said shafts 14 is a vertical series of truncated conical picker elements 15, provided with picker spurs 16 in suitable arrangement to be effective for detaching the cotton bolls from the plants. The shafts 14 may be driven by any suitable means from one of the drive axles. In the present instance the axles 12 are equipped with sprocket wheels 17 and chains 18 run over said sprocket wheels 17 and over sprocket pinions 19 on a horizontal shaft 20. On the shaft 20 also is a sprocket pinion 21 and a chain 22 runs over the pinion 21 and over a second sprocket pinion 23 on a stub shaft 24 on frame 10. On each shaft 24 also is a bevel pinion 25 which meshes with a second bevel pinion 26 on the upper end of the picker shaft 14. The driving arrangement shown is duplicated at each side of the machine, that is to say, in association with each shaft 14.

Figure 2:
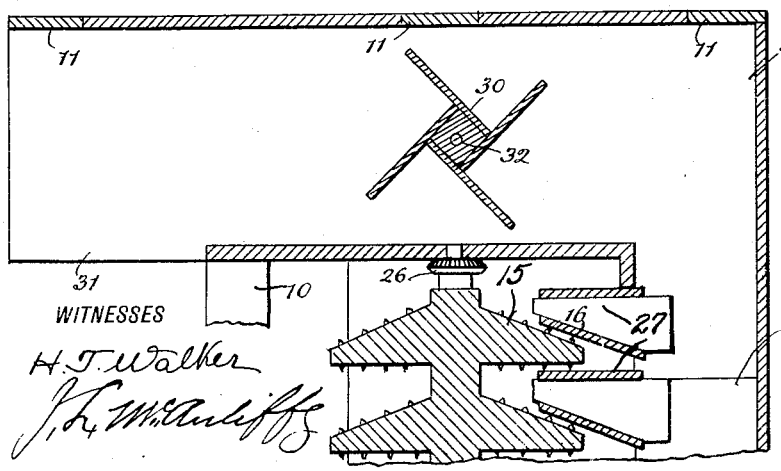
Figure 2 is a detail in transverse vertical section taken through the fan chamber and the upper portion of the suction box as well as through one of the nozzles and a portion of one of the series of picker elements; the plane of the section being indicated by the line 2—2 in Figure 3.

At all events the drive means is of such a character as to turn the opposed sides of the elements 15 in a rearward direction to draw the cotton inwardly into the machine. Projecting between and thus alternating with the picker elements 15 are suction nozzles 27 arranged in vertical series, one of which suctions nozzles is shown in vertical section in Figure 2. The respective series of suction nozzles are in communication with suction boxes 28 extending vertically at each side of the machine. The suction boxes 28 are complementary to fan chambers 29 in each of which is any suitable suction fan 30 acting to draw the air from the suction boxes 28, and thus through the nozzles 27, so that the cotton will be taken from the picker elements 15 and caused to pass into the nozzles 27 and through the suction boxes 28 and fan chambers 29. The blades of the fans 30 tend to pass the cotton rearwardly in the fan chambers 29 so that the cotton may escape as at 31 into any convenient receptacle, not shown, provided for the purpose.

It is to be noted that the nozzles 27 are given a form to be accommodated in the inwardly tapering space between the bottom of one picker 15 and the conical top of the next picker below.

A fan shaft 32 is driven in the illustrated form as follows: On said shaft is a small sprocket pinion 33 over which a chain 34 runs, said chain running also over a large sprocket wheel 35 on shaft 20 so that the fan shaft 32 is driven from said shaft 20. As the fan is thus geared up to high velocity a powerful suction is produced in suction boxes 28 and across the picker elements 15 to effectively strip the cotton from the spurs 16.

In operation as the cotton picker machine is drawn over the field the row of plants will pass between two vertical series of picker elements 15 and as the bolls are detached by the spurs 16 the turning of said picker elements will bring the bolls to the region of the nozzles 27 so that the cotton, as described, will pass through said nozzles, through the suction boxes 28 and fan chambers 29, and to the discharge outlets 31.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a wheeled cotton picker, vertical picker shafts revolubly mounted and spaced laterally from each other to pass at opposite sides of a row of cotton plants, vertical series of picker elements on each shaft and formed of truncated cone shape, picking spurs disposed on the upper tapering surfaces of said picker elements, a vertical series of transversely disposed tapering suction nozzles adjacent to each picker shaft, said nozzles alternating with the picker elements and projecting respectively between adjacent picker elements, suction boxes disposed at a side of each series of suction nozzles, said nozzles communicating with said suction boxes, and means tending to produce a vacuum in said boxes to cause the air passing into the suction nozzles to detach the cotton from the picker elements and direct the cotton through the suction boxes.

2. In a wheeled cotton picker, vertical picker shafts revolubly mounted and spaced laterally from each other to pass at opposite sides of a row of cotton plants, vertical series of picker elements on each shaft and formed of truncated cone shape, picking spurs disposed on the upper tapering surfaces of said picker elements, a vertical series of transversely disposed tapering suction nozzles adjacent to each picker shaft, said nozzles alternating with the picker elements and projecting respectively between adjacent picker elements, suction boxes disposed at a side of each series of suction nozzles, said nozzles communicating with said suction boxes, fan chambers to which the said suction boxes are complementary, and fans in said chambers to cause suction in said suction boxes and adapted to force the cotton past the fans and through the fan chambers, said fan chambers having discharge outlets.

3. In a wheeled cotton picker, vertical series of picker elements spaced laterally to pass at opposite sides of a row of cotton plants, picker members on said picker elements of truncated cone shape forming an inwardly tapering space between the top of one picker element and the bottom of the next picker element above, suction nozzles alternating with the picker elements said suction nozzles tapering to be accommodated in the space between adjacent picker elements, a chamber in communication with said nozzles, and means in said chambers to produce suction through said nozzles for detaching the cotton from the picker elements and causing it to pass to said chamber.

4. In a wheeled cotton picker, vertical series of picker elements spaced laterally to pass at opposite sides of a row of cotton plants, picker members on said picker elements of truncated cone shape forming an inwardly tapering space between the top of one picker element and the bottom of the next picker element above, suction nozzles alternating with the picker elements, said suction nozzles tapering to be accommodated in the space between adjacent picker elements, a chamber in communication with said nozzles, and fans in said chamber adapted to cause suction in said chamber and in said nozzles and to force the cotton through said chamber.

EDWARD FRANCIS O'HAVER.